United States Patent
Rains

[11] Patent Number: 5,127,441
[45] Date of Patent: Jul. 7, 1992

[54] COAXIAL PIPING SYSTEM

[76] Inventor: Robert L. Rains, 2135 Napoli Dr., Oxnard, Calif. 93030

[21] Appl. No.: 122,537

[22] Filed: Nov. 12, 1987

Related U.S. Application Data

[63] Continuation of Ser. No. 937,441, Dec. 3, 1986, abandoned, which is a continuation of Ser. No. 809,584, Dec. 16, 1985, abandoned.

[51] Int. Cl.⁵ .................................................. F16L 11/12
[52] U.S. Cl. ................................ 138/114; 138/111; 138/113; 138/148; 138/103; 138/104; 165/184
[58] Field of Search ............... 138/103, 104, 113, 114, 138/111, 148, 129, 132, 133, 37, 39; 165/184

[56] References Cited

U.S. PATENT DOCUMENTS

| | | | |
|---|---|---|---|
| 229,620 | 7/1880 | Lynch | 138/148 |
| 531,000 | 12/1894 | Morrison | 138/148 |
| 644,841 | 3/1900 | Allen | 138/148 |
| 2,409,304 | 10/1946 | Morrison | 138/113 |
| 2,475,635 | 7/1949 | Parsons | 138/114 X |
| 2,756,032 | 7/1956 | Dowell | 138/148 |
| 2,915,089 | 12/1959 | Horsting | 138/113 |
| 3,299,417 | 1/1967 | Sibthorpe | 138/148 |
| 3,332,446 | 7/1967 | Mann | 138/148 |
| 3,399,691 | 9/1968 | Schoch et al. | 138/148 |
| 3,750,058 | 7/1973 | Bankert et al. | 138/113 |
| 3,809,128 | 5/1974 | Tateisi et al. | 138/114 |
| 3,830,290 | 8/1974 | Thamasett et al. | 138/114 X |
| 4,259,990 | 4/1981 | Rohner | 138/114 X |
| 4,307,754 | 12/1981 | Muratsubaki | 138/DIG. 8 |

FOREIGN PATENT DOCUMENTS

| | | | |
|---|---|---|---|
| 12909 | of 1896 | United Kingdom | 138/148 |
| 181590 | 6/1922 | United Kingdom | 165/184 |

Primary Examiner—James E. Bryant, III
Attorney, Agent, or Firm—Blakely, Sokoloff, Taylor & Zafman

[57] ABSTRACT

In a coaxial piping system for the transport of toxic and hazardous gases having an inner conduit wherein hazardouses gases are transported therethrough and having a spacer helically wound about the inner conduit within a volume between the inner conduit and an outer conduit.

7 Claims, 1 Drawing Sheet

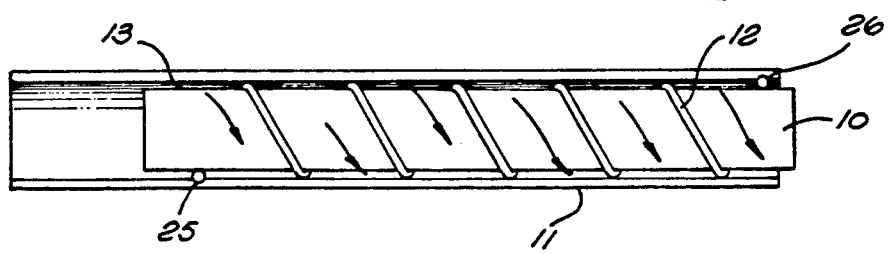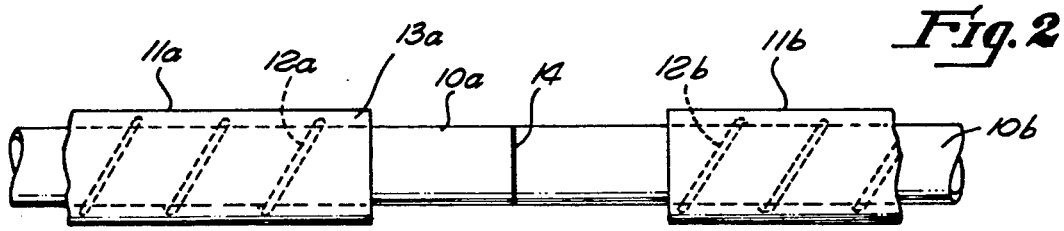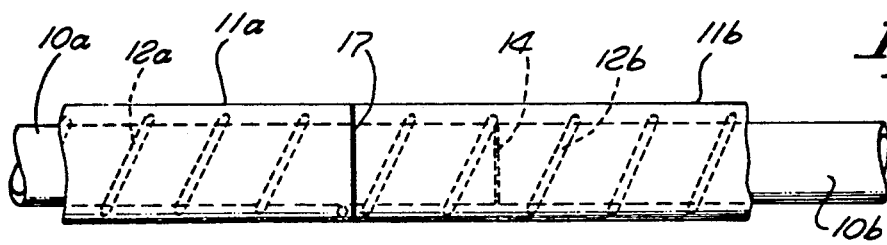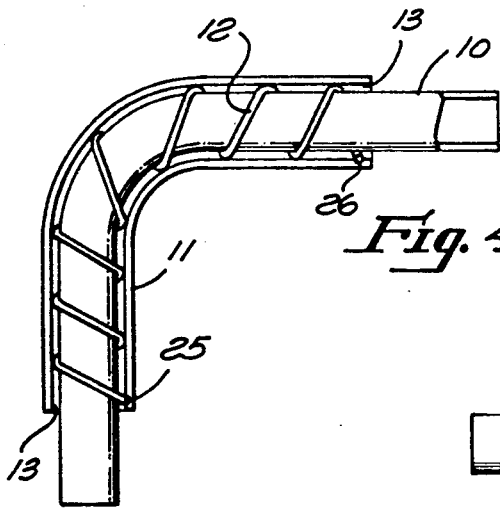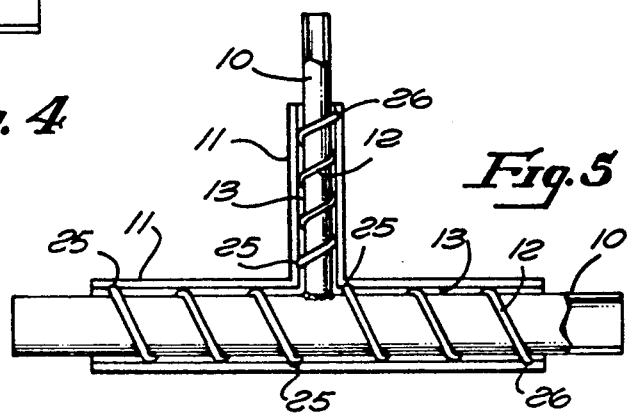

5,127,441

COAXIAL PIPING SYSTEM

This is a continuation of Ser. No. 932,441, filed on Dec. 3, 1986, now abandoned, which is a continuation of Ser. No. 809,584, filed on Dec. 16, 1985, now abandoned by Robert L. Rains, for COAXIAL PIPING SYSTEM.

FIELD OF THE INVENTION

The present invention relates to coaxial piping systems for the transportation of toxic and hazardous gases. More particularly, the present invention relates to a coaxial piping system that permits bending of the coaxial pipes without crimping, provides safe purging of escaped gases and reduces stress fractures caused by vibrations.

BACKGROUND AND SUMMARY OF THE INVENTION

Over the years, the transport of toxic and hazardous gases, such as nitrogen, argon, hydrogen, oxygen, silane, phosphine, arsine, plus various mixed gases, via piping systems, has presented a serious problem for engineers, contractors and others who use or effect transportation of these gases. When piping systems are used to transport such gases or fluids from one point to another there always exists the possibility of a leak occurring in the piping system, thereby allowing hazardous or toxic gases to escape, thus presenting the possible risks of death or sickness resulting from inhalation of the gases by persons near the piping system or explosion, should the escaped incendiary gases ignite.

Prior art methods attempting to solve this problem use coaxial piping systems having a conduit or pipe for transporting the hazardous fluids contained inside an outer conduit so that should a leak occur at the inner transporting pipe the fluids would be contained in the volume between the inner conduit and the outer conduit. This method, however, has presented many drawbacks in that when bending such a coaxial system to conform to the desired path of the piping system, the inner pipe often crimps or buckles at the elbow of the bend. Also, fracture of the inner conduit due to stress caused by vibrations occurs in such prior art coaxial piping systems because the inner conduit is suspended inside the outer tube, and thus vibrates and eventually fractures or cracks at stress points.

Another drawback relates to the method for alleviating the problems occurring as a result of leakage. In the prior art, when a leak occurs in such a system, the hazardous fluid or gas emanates from the point of the leak into the volume between the inner conduit and the outer conduit, thereby creating a pocket of hazardous gas. In order to flush this gas from the volume between the inner and outer conduit a purging gas must be sent through the volume between the inner conduit and the outer conduit. However, because the leaking hazardous or toxic gas collects and forms a pocket of gas around the leak, as it is purged from the system the hazardous gas emanates at an output of the coaxial system in a somewhat concentrated form. Such an output of a relatively concentrated pocket of hazardous gas presents the aforementioned dangerous possibilities of fatal or otherwise dangerous inhalation or explosion or fire.

SUMMARY OF THE PRESENT INVENTION

The present invention overcomes the problems and obstacles contained in the prior art through the discovery of a unique coaxial piping system that prevents crimping of the inner pipe when a coaxial run of piping in bent. The present invention also disperses leaking gas contained in the volume between the inner pipe and the outer pipe by thoroughly mixing the purging gas with the leaking gas. Moreover, the present invention absorbs vibrations in the coaxial piping system thereby preventing such vibrations from causing fractures and leaks in the inner pipe.

Accordingly, the present invention relates to a coaxial piping system for the transport of fluid therethrough, the coaxial piping system having an outer conduit, an inner conduit disposed within the outer conduit along the longitudinal axis thereof, a means for centering the inner conduit within the outer conduit, the centering means comprising a spacer helically wound about the inner conduit, the coils of the helical spacer being sufficiently spaced apart to permit fluid flow in the volume between the inner conduit and the outer conduit. The purging fluid traveling through the volume between the inner conduit and the outer conduit thoroughly mixes with and disperses the leaking gas present in the volume between the inner conduit and the outer conduit. The spacer also prevents crimping of the inner conduit when the coaxial piping system is bent to conform to the desired conformation of the piping system. In addition, vibrations present in the coaxial piping system are absorbed by the helical spacer, thereby preventing stress fractures in the inner conduit.

BRIEF DESCRIPTION OF THE DRAWINGS

In FIG. 1 there is shown a part cross sectional view of the coaxial piping system of the present invention.

FIG. 2 is a partial cutaway sideview of the present invention illustrating the method of constructing the invented coaxial piping system.

FIG. 3 is a partial cutaway sideview of the present invention illustrating the method of constructing the invented coaxial piping system.

FIG. 4 illustrates a part cross sectional view of an elbow of the coaxial piping system of the present invention.

FIG. 5 shows the coaxial piping system of the present invention configured in the form of a T-shape.

DETAILED DESCRIPTION OF THE PREFERRED EMBODIMENT

In FIG. 1 there is shown a partial cross sectional view of the coaxial piping system of the present invention having an inner conduit 10 with a helical spacer 12 disposed continously around the inner conduit 10. The inner conduit 10 and the helical spacer 12 are disposed inside an outer conduit 11 as shown in FIG. 1. The thickness of the helical spacer 12 is approximately equal to the distance between the outer wall of the inner conduit 10 and the inner wall of the outer conduit 11 such that the helical spacer 12 snugly fits within the volume 13 between the inner conduit 10 and the outer conduit 11. The snug fit secures the helical spacer 12 in the desired position without requiring any additional means for securing the spacer. The coils of the helical spacer 12 are sufficiently spaced apart from one another to permit fluid communication through the volume 13 between the inner conduit 12 and the outer conduit 11.

In another embodiment, the helical spacer 12 may be provided with gripper ends 25 and 26 which are hook like projections that may fit into detents in the outer conduit 11, as shown in FIG. 1, or around projections (not shown) in the outer conduit 11 or inner conduit 10, to prevent the helical spacer 12 from sliding or moving about within volume 13. The inner conduit 10 and the outer conduit 11 may be constructed substantially of metallic material or, plastic material such as PVC. The helical spacer 12 may be formed from metallic material such as spring steel or from resilient materials such as rubber, plastic or the like so long as such materials are strong enough to prevent crimping of the inner conduit 11 when the coaxial piping system is bent. The materials should also be resistant to whatever gases or liquids are transported through the piping system.

When a leak develops in the inner conduit 10 the toxic or otherwise hazardous gas transported by the inner conduit 11 escapes into the volume 13 between the inner conduit 10 and the outer conduit 11. It then becomes necessary to purge the coaxial system of the escaped toxic gas. This is accomplished by injecting a purging gas into the volume 13. Purging gases injected into the volume 13 are thereby forced to travel around the inner conduit 10 along the coils of the helical spacer 12, in the direction shown by the arrows shown in FIG. 1, thereby taking a helical path in its travel through the volume 13. This helical path creates a turbulance in the purging gas which thoroughly mixes with pockets of the toxic or hazardous gas that has escaped from a leak in the inner conduit 10, so that a pocket of escaped dangerous gas present in the volume 13 mixes with and disperses into a purging gas traveling through the volume 13.

It will be appreciated that helical spacer 12 also serves the purpose of absorbing vibrations that occur through normal use and where and tear of the coaxial piping system by absorbing and equally distributing such vibrations over the length of the coaxial piping system and substantially preventing the inner conduit 10 from vibrating within the outer conduit 11, thereby preventing stress fractures that would otherwise be caused by such vibrations.

FIGS. 2 and 3 illustrates the process of construction of a straight line of coaxial piping embodying the present invention. Helical spacer 12A is inserted about the inside diameter of outer conduit 11A thereby forming a combination thereof. Inner conduit 10A is inserted within the combination of outer conduit 11A and helical spacer 12A such that, as stated, helical spacer 12A fits snuggly within volume 13A between the inner conduit 10A and the outer conduit 11A. The same steps are performed with respect to helical spacer 12B, outer conduit 11B and inner conduit 10B. A first inner conduit 10a is brought into contact with a second inner conduit 10b so that their ends abut at 14. The abutting ends of 10a and 10b are then butt welded together at 14 and leak tested. The outer conduits 11a and 11b having, respectively helical spacers 12a and 12b are slid into position such that their ends abut one another at 17 and so that outer conduit 11b covers the inner conduit weld joint at 14. The abutting ends of the outer conduits 11a and 11b are then welded together, forming a weld joint at 17, and leak tested.

In FIG. 4 there is shown a partial cross sectional view of an elbow of the coaxial piping system of the present invention. In prior art devices, when such a bend was needed or desired in a coaxial piping system both tubes would be bent together and often undetected crimp or crack, or at least serious stress, in the inner conduit 10 would occur as a result of the bending. Such crimping that occurred in prior art coaxial piping systems also created a weakening of the inner conduit 10 which led to stress fractures at the crimped points and therefore leaking of the toxic or hazardous gases. The helical spacer 12 prevents crimping of the pipe by uniformly distributing deformation forces evenly along the length of the inner conduit 10 when the coaxial piping is bent. Thus, when a length of coaxial piping of the present invention is bent to form, for example an elbow, as shown in FIG. 4, the radius of curvature of the inner conduit 10 is substantially equal to the radius of curvature of the outer conduit 11, thereby avoiding crimping of the inner conduit 10, and the accompanying stress fractures and leaks therein.

In FIG. 5 there is shown a partial cross sectional view of the coaxial piping system of the present invention employed to form a reducing T-shaped coaxial piping system. The structure of FIG. 5 is constructed using similar methods as shown in FIGS. 2 and 3 and as previously discussed.

Also, it will be appreciated that the present invention may be embodied in other specific forms without departing from the spirit or essential characteristics thereof. The present embodiments are, therefore, to be considered in all aspects as illustrative and not restrictive, the scope of the invention being indicated by the appended claims rather than by the foregoing description and all changes which come within the meaning and range of equivalency are, therefore, intended to be embraced therein.

What is claimed is:

1. A coaxial piping system for the transport of gases therethrough of the type used with a purging gas for purging pockets of escaping gases from said system, said coaxial piping system comprising:
   a substantially non-expandable outer conduit;
   an inner conduit disposed within said outer conduit along the longitudinal axis thereof and having a uniform outer diameter;
   a spring coil helically wound about said inner conduit, said spring comprising resilient unitary material and having gripping flanges, said spring having a thickness approximately equal to the difference between the inner diameter of said outer conduit and the outer diameter of said inner conduit, and
   attachment means for securing said spring in place, said attachment means being adapted to mate with said gripping flanges for such a securement,
   the coils of said spring being sufficiently spaced apart from one another to permit fluid flow through the volume between said inner conduit and said outer conduit such that purging gas traveling through said volume is forced to travel in a helical path around said spacer thereby dispersing and evenly mixing with pockets of gas which have escaped from the inner conduit and are present in said volume.

2. The coaxial piping system as claimed in claim 1 wherein said gripping flanges are disposed at each end of said spring coil so that said spring coil grips the respective ends of said outer conduit thereby preventing said spring coil from substantial movement during construction and operation of said coaxial piping system.

3. The coaxial piping system as claimed in claim 1 wherein said inner conduit and said outer conduit are substantially metallic.

4. A coaxial piping system as claimed in claim 1 wherein said spring helically wound about said inner conduit is substantially comprised of resilient material, said resilient material being sufficiently strong enough to prevent crimping of the inner conduit when said coaxial piping system is bent to a desired shape.

5. The coaxial piping system as claimed in claim 1 wherein said inner conduit and said outer conduit are formed substantially from plastic material.

6. The coaxial piping system as claimed in claim 1 wherein said spring helically wound about said inner conduit is comprised substantially of metallic spring material.

7. A coaxial piping system for the transport of fluid therethrough, said coaxial piping system comprising:

an outer conduit having a first inner diameter and a first and a second end, and a detent disposed adjacent each end;

an inner conduit disposed within said outer conduit along the longitudinal axis thereof, said inner conduit having a second outer diameter which is less than said first inner diameter;

a means for dispersing gas escaping from said inner conduit, said dispersing means comprising a spring coil helically wound about said inner conduit, said spring comprising resilient unitary material and having gripping flanges which are adapted to mate with said detents in said outer conduit thereby securing said spring in place, said spring also having a thickness approximately equal to the difference in diameter of said outer conduit and the outer diameter of said inner conduit, the coils of said spring being sufficiently spaced apart form one another to permit fluid flow through the volume between said inner conduit and said outer conduit such that purging gas traveling through said volume is forced to travel in a helical path around said spacer thereby dispersing and evenly mixing the pockets of escaping gas present in said volume; and wherein said gripping flanges are disposed at each end of said spring so that said coil gripping flanges grips respective ends of said outer conduit thereby preventing said spring from moving about during construction and operation of said coaxial piping system.

* * * * *